(12) United States Patent
Maes et al.

(10) Patent No.: US 9,730,390 B2
(45) Date of Patent: Aug. 15, 2017

(54) CHAFF SPREAD ASSISTED BY CROSS-BLOWN AIRFLOW

(71) Applicant: CNH Industrial America LLC, New Holland, PA (US)

(72) Inventors: Eli Maes, Snaaskerke (BE); Frank R. G. Duquesne, Zwevegem (BE); Mark D. Dilts, New Holland, PA (US); Dieter Fauconnier, Merelbeke (BE); Stefaan Desmet, Vosselare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/747,647

(22) Filed: Jun. 23, 2015

(65) Prior Publication Data

US 2016/0374270 A1    Dec. 29, 2016

(51) Int. Cl.
  *A01D 41/12*    (2006.01)
  *A01F 12/00*    (2006.01)

(52) U.S. Cl.
  CPC .............. *A01F 12/00* (2013.01); *A01D 41/12* (2013.01); *A01D 41/1243* (2013.01)

(58) Field of Classification Search
  CPC ........... A01D 41/1243; A01D 41/1252; A01F 12/444; A01F 12/48; B65G 31/04
  USPC .................. 460/111, 112; 239/654, 681, 682
  See application file for complete search history.

(56) References Cited

U.S. PATENT DOCUMENTS 4,591,102 A * 5/1986 Clarke ............... A01D 41/1243
                                                       239/655
4,711,253 A * 12/1987 Anderson .......... A01D 41/1243
                                                       460/100
4,917,652 A * 4/1990 Glaubitz ............ A01D 41/1243
                                                       239/682
8,105,140 B2 * 1/2012 Teroerde ............ A01D 41/1243
                                                       460/112
8,210,915 B2 * 7/2012 Holmen ............. A01D 41/1243
                                                       460/111
2007/0015556 A1   1/2007 Johnson et al.
2014/0158207 A1 * 6/2014 Rosec .................... B65G 31/04
                                                       137/1

FOREIGN PATENT DOCUMENTS

| CA | 2573944 A1 | 3/2005 | |
| DE | 10 2006 017 404 A1 | 10/2007 | |
| DE | EP 1897430 A1 * | 3/2008 | ......... A01D 41/1243 |
| WO | 9313643 A1 | 7/1993 | |
| WO | 9710701 A1 | 3/1997 | |

* cited by examiner

Primary Examiner — John G Weiss
(74) Attorney, Agent, or Firm — Patrick M. Sheldrake

(57) ABSTRACT

A spreader for a harvesting machine includes a pair of counter-rotating spreader units each having an impeller and a fan supported on a common shaft. A plenum routes at least part of the airflow from a first fan to merge with chaff exiting the opposite impeller and at least a part of the airflow from the opposite fan to merge with chaff exiting the impeller on the machine side of the first fan. In one embodiment all airflow from a fan is ducted to an impeller on the opposite side, while a second embodiment commingles airflow from both fans in a plenum from which portions of the mixed airflows is directed to the chaff exiting each impeller exit. In a third, embodiment an established airflow receives chaff from the impeller on the side on which that airflow is generated.

17 Claims, 6 Drawing Sheets

CHAFF SPREAD ASSISTED BY CROSS-BLOWN AIRFLOW

BACKGROUND OF THE INVENTION

1. Field of the Invention

The present invention relates generally to agricultural equipment, such as harvesters, and more specifically, to spreader arrangements on such harvesters for spreading agricultural residue such as chaff to a field.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing and performs a threshing operation on the crop to remove the grain. Once the grain is threshed, it falls onto a grain pan. From the grain pan, the grain is cleaned using a cleaning system, and is then transported to a grain tank onboard the combine.

During the process of harvesting, crop material other than grain (MOG) is intended to be expelled from the combine. This material is usually derived from two areas, the threshing rotor and/or the cleaning system. The material expelled from the threshing rotor is generally referred to as straw and the material expelled from the cleaning system is generally referred to as chaff. This material or crop residue is typically dealt with by spreading or windrowing. Spreading is accomplished using a mechanical device termed a spreader to distribute the straw and/or chaff substantially evenly from the rear of the combine.

The light particle stream called chaff produced by a harvesting operation, is because of its low density and high air resistance, difficult to throw. Current chaff spreaders struggle to spread chaff wide enough for customer demands. Attempts to entrain the chaff with an air stream by introducing airflow into the chaff spreader have met with limited success. A design with an impeller above and a fan below struggled to mix the chaff with the airflow and suffered from high pressure air bleeding out of the fan portion and blowing chaff in an uncontrolled manner.

What is needed in the art is an effective way of generating a controlled air-blast and mixing the chaff with this air blast to provide a compact yet effective spreader for distributing chaff or other crop residue laterally to opposite sides of the harvesting machine.

SUMMARY OF THE INVENTION

The present invention provides a pair of spreader units each having a pneumatic source and a chaff spreading impeller. Air from each pneumatic source may be at least partially routed to the opposed impeller, or chaff exiting from one side impeller may join with and be entrained in a shaped airflow from that same side.

The invention in one form is directed to a spreader arrangement for an agricultural harvester which includes at least first and second spaced apart spreader units, each unit including an impeller for expelling crop residue from the harvester, and a pneumatic source such as a fan for creating an airflow to assist in dispersing the crop residue. There is a plenum for routing at least part of the airflow from the first unit pneumatic source to the vicinity of the second unit impeller to aid residue expulsion therefrom and at least part of the airflow from the second unit pneumatic source to the vicinity of the first unit impeller to aid residue expulsion therefrom. In one embodiment, all the air from a pneumatic source is directed to an opposed impeller while in another embodiment the two airflows are merged and a portion of the merged air is supplied to each impeller. In a third embodiment air from each side is utilized to expel residue from that same side.

The invention in another form is directed to a process of dispersing crop residue from the operation of a harvesting machine in which an airflow is generated near the bottom and laterally to one side of the harvesting machine. Crop residue from a harvesting operation is spun causing the residue to exit the harvesting machine. The generated airflow is ducted along an optimally straight and direct path toward the exiting crop residue where it is shaped by passing it through a nozzle to provide a residue entraining airflow. The exiting crop residue is directed with an initial velocity to join with and be entrained in the shaped airflow.

An advantage of the present invention is the airflow is given a longer time to develop as a controlled laminar flow.

Another advantage is piggybacking of the fans and impellers requires only one pair of hydraulic motors.

A further advantage is the cross-flow design gives a greater distance for the airflow to be controlled and mixed with the chaff permitting the airflow to be routed so the chaff is injected into the established air-stream. The nozzle may potentially be out of the way of material flow and need not be as substantial, or at as great a risk for plugging.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
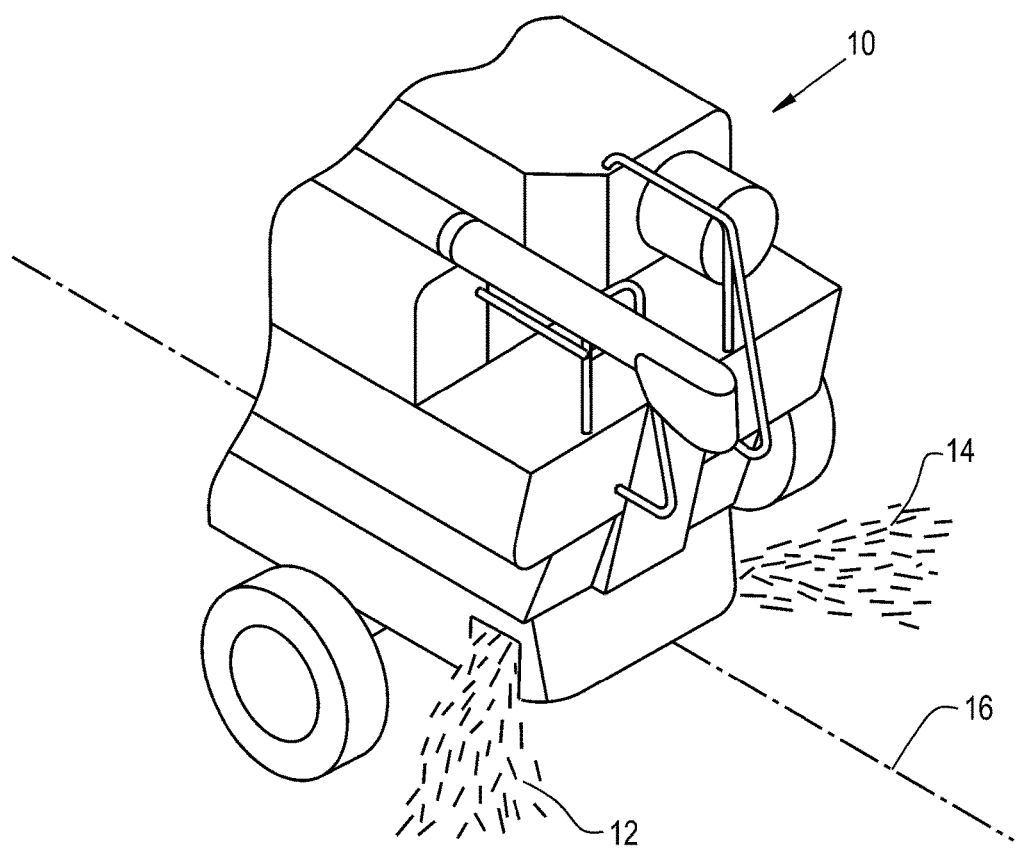
FIG. 1 is a rear perspective view of an embodiment of a combine harvester with a spreader arrangement.

Referring now to the drawings, and more particularly to FIG. 1 there is shown an agricultural harvester 10 in operation with a flow of crop residue (chaff) 12 and 14 exiting laterally from the harvester to either side of a harvester centerline 16. The lateral residue flows 12 and 14 are generated by a pair of counter-rotating spreader units (FIGS. 2-5) in the lower rearward portion of the harvester, one to either side of the centerline 16.

The harvester 10 may harvest grains such as barley, corn, flax, oats, rye, soybeans, wheat, and so forth. Accordingly, the harvester 10 is configured to remove the desired portion of the plant and to separate the portion into different agricultural materials (e.g., grain, straw, and chaff). As discussed above, the harvester discharges this material after processing it. Some of the agricultural materials may be discharged near the rear of the harvester 10 and to either side thereof by the spreader units to distribute crop residue over a field. The harvesting machine of FIG. 1 may also spread straw from conventional spreading equipment from near the center of the rear of the machine. The straw spreading equipment is typically located behind and slightly above the chaff spreading portion. This straw stream is discharged and tends to be slightly heavier in the middle and spreading chaff from the machine sides as shown results in an acceptably uniform residue distribution.

Figure 2:
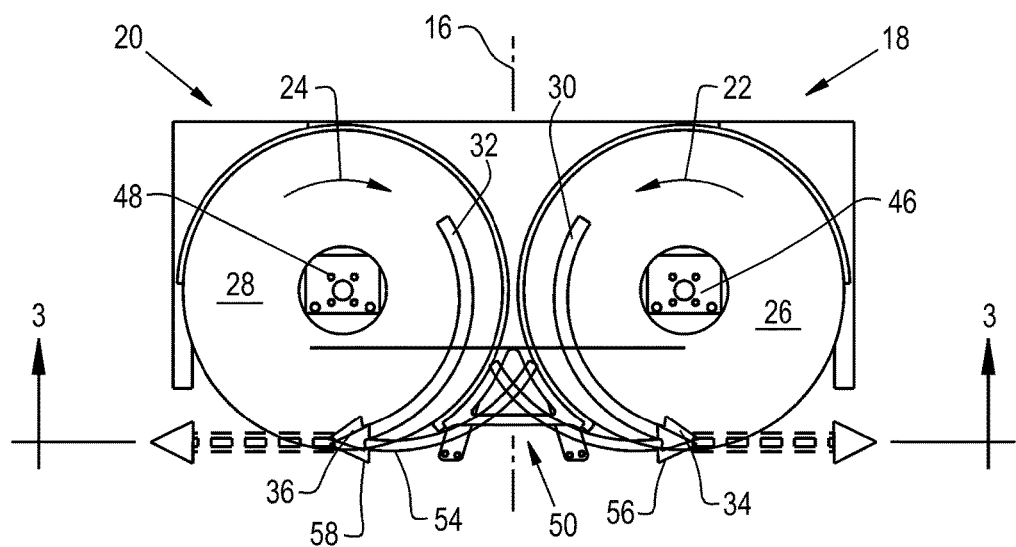
FIG. 2 is a schematic illustration of the spreader arrangement from above generally along line 2-2 of FIG. 3.
Figure 3:
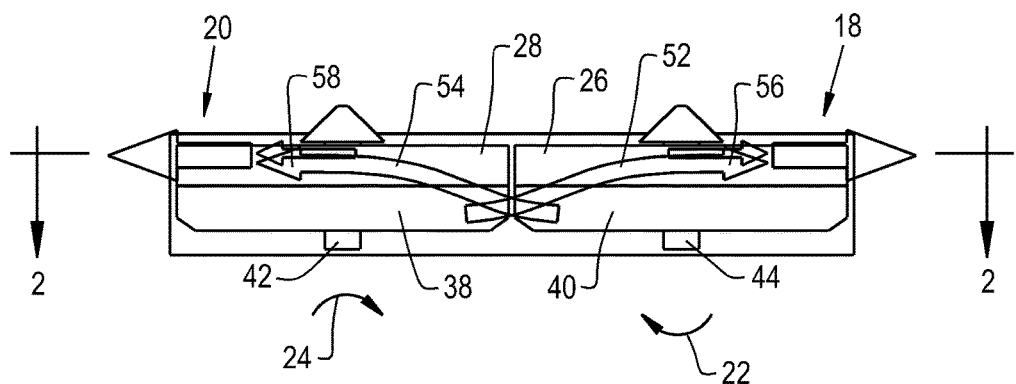
FIG. 3 is a schematic illustration of the spreader arrangement from behind the harvester generally along line 3-3 of FIG. 2.

In FIGS. 2 and 3, the power sources for the spreader units 18 and 20 are schematically shown by the rotational arrows 22 and 24. The power sources may be a pair of drive motors positioned below to rotatably drive each respective spreader unit. Although not essential, the spreader units are rotated in opposite senses as shown. These drive motors may be configured as hydraulic motors, but could also be electric or pneumatic motors. Other drive techniques such as a pair of bevel gears on a common rotatable shaft each meshing with a further bevel gear on a respective spreader unit shaft may be employed.

In FIG. 2, the spreader units 18 and 20 are seen to each include an upper impeller 26 or 28. The impellers function as spinning mechanisms. Crop residue such as chaff is spun by the respective impellers along the paths indicated by arrows 30 and 32. The chaff is spun off and exits the respective units tangentially near the arrow tips at 34 and 36.

In FIG. 3, the spreader units are further seen to each include a pneumatic source such as fan 38 or 40. These fans may have a scroll shaped outer housing to assist the generation of a controlled airflow. The fans are each mounted on a common shaft 42 or 44 beneath the corresponding impellers and together with the fan and impeller constitute a spreader unit rotor. Bearings for the vertically extending rotors are seen at 46 and 48 of FIG. 2.

A plenum indicated generally at 50 includes two conduits 52 and 54 which are isolated from one another, one passing over the other without connecting therewith. Conduit 52 routes substantially the entirety of the air flow from fan 38 to the vicinity of impeller 26, while conduit 54 routes substantially the entirety of the air flow from fan 40 to the vicinity of impeller 28. Each conduit 52 or 54 terminates in a nozzle 56 or 58 close to a corresponding impeller for directing air flow along the tangential path of the exiting crop residue. Preferably, the nozzles are located just prior to the exiting chaff so the chaff is injected into an established air-stream. This nozzle location helps prevent nozzle clogging. In each case, the conduit 52 or 54 functions to direct the fan generated airflow obliquely upward to join with crop residue and exit the harvesting machine on the machine side opposite the side on which that air flow was generated.

Figure 4:
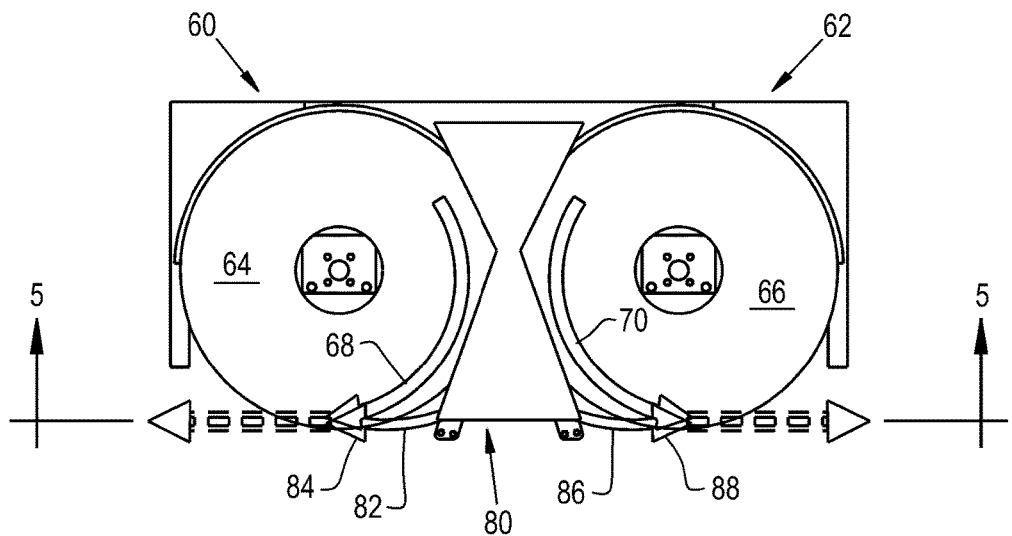
FIG. 4 is a schematic illustration of the spreader arrangement from above generally along line 4-4 of FIG. 5.
Figure 5:
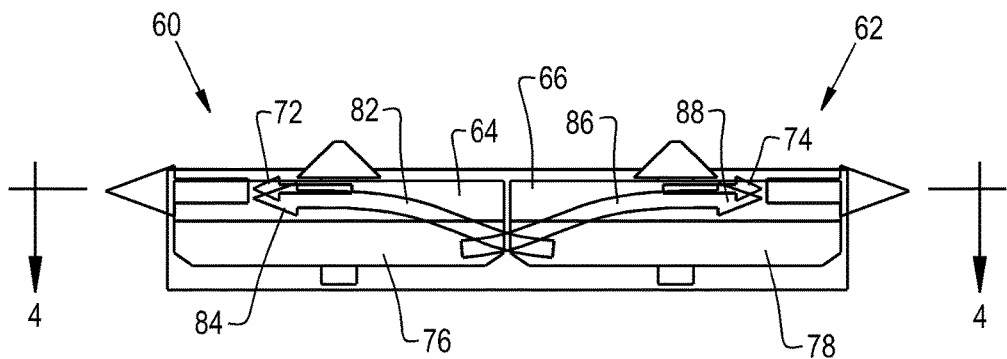
FIG. 5 is a schematic illustration of the spreader arrangement from behind the harvester generally along line 5-5 of FIG. 4.

FIGS. 4 and 5 illustrate a somewhat different plenum configuration in conjunction with an otherwise very similar spaced apart pair of spreader units 60 and 62. The spreader units 60 and 62 are seen to each include an upper impeller 64 or 66. Crop residue such as chaff is spun by the respective impellers along the paths indicated by arrows 68 and 70. The chaff is spun off and exits the respective units tangentially near the arrow tips at 72 and 74.

In FIG. 5, the spreader units are further seen to each include a pneumatic source such as fan 76 or 78. The fans are each mounted on a shaft beneath the corresponding impeller and a shaft together with the fan and impeller constitutes a spreader unit rotor.

The plenum 80 in FIGS. 4 and 5 ducts the two airflows from the fans obliquely upward to merge with one another. The plenum provides a common chamber for commingling the airflow from each of the pneumatic sources (fans) 76 and 78. Conduit 82 supplies a portion of the merged airflow from each pneumatic source to a nozzle 84 in the vicinity of the tangentially exiting residue at 72 where it laterally joins the crop residue. Similarly, conduit 86 ducts a portion of the merged airflow from each pneumatic source to a nozzle 88 in the vicinity of the tangentially exiting residue at 74 where it laterally joins the crop residue.

As thus far described, chaff flow from the cleaning shoe of a combine or other harvesting machine is directed into an impeller where it is accelerated and discharged roughly perpendicular to the combine travel. Concurrent with exiting the impeller, the chaff encounters and is entrained in an airblast directed at it from a fan underneath another impeller (on the other side of the machine). Twists and turns cause losses and the circuitous air routes of the conduits 52 and 54 crossing one another or of mixing airflows in a common plenum tend to impede airflow. A stronger airflow may be achieved from the techniques of FIGS. 6-10.

Figure 6:
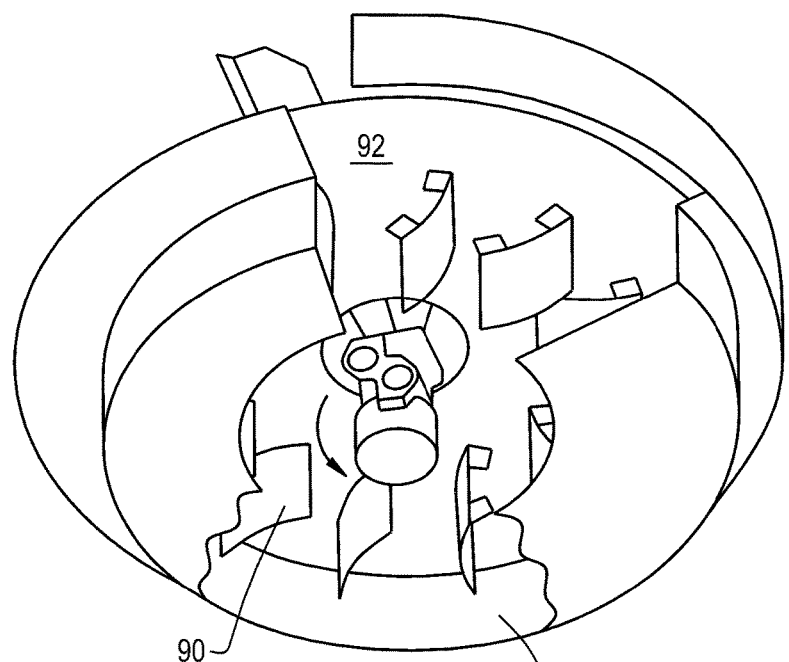
FIG. 6 is a partly broken-away isometric view of the fan portion of a single spreader unit illustrating a variation on the present invention.
Figure 7:
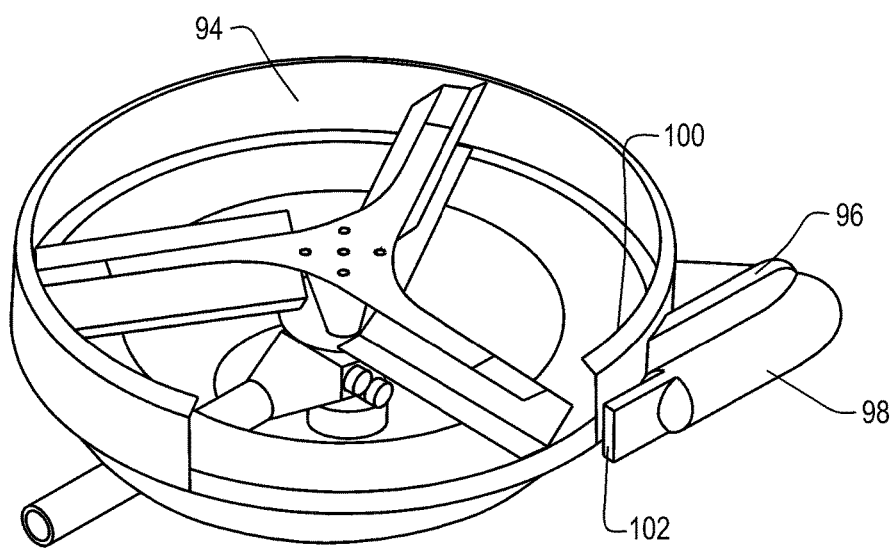
FIG. 7 is a partly broken-away isometric view of the chaff impeller portion of the single spreader unit of FIG. 6.
Figure 8:
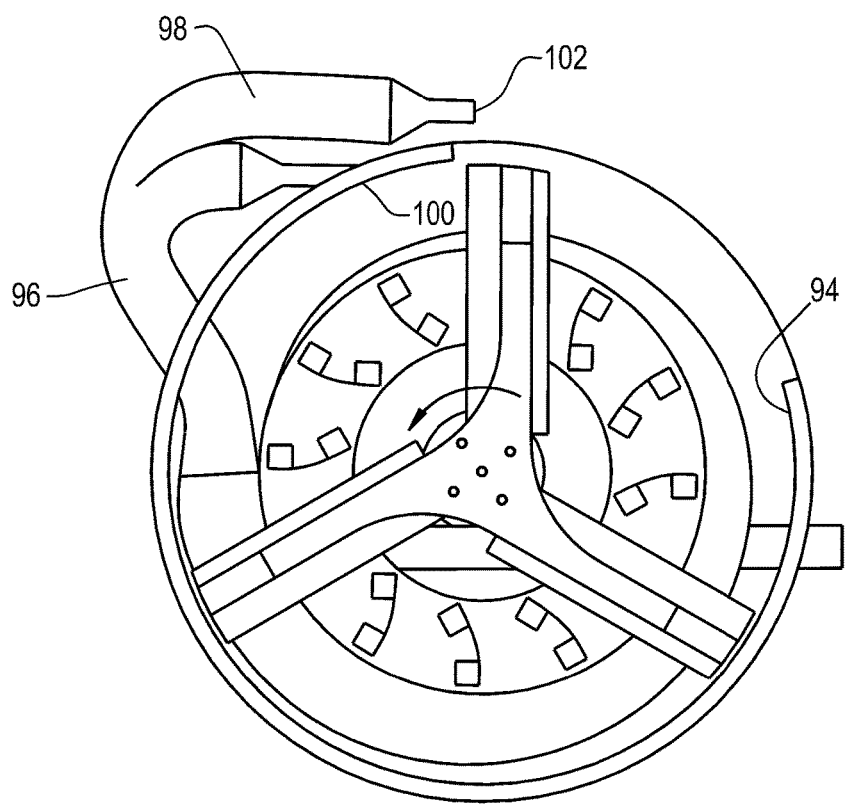
FIG. 8 is a top view of the single spreader unit of FIGS. 6 and 7.

FIGS. 6-8 illustrate a further variation on the chaff spreader of the present invention. The two spreader units operate essentially independently of one another and only one of the two spreader units is illustrated. The fan consists of vanes 90 mounted on the disc 92 which is the bottom disk of the spreader unit and rotates within a scroll-shaped housing 94. The air inlet of the fan is typically a central suction eye oriented toward the ground and the air at the end of the scroll is led into the conduits 96 and 98 providing a local supporting air jet at the spreader exit. First, the chaff thrown out of the spreading unit is mixed with the air coming from nozzles 100 within the housing. Second, the air/chaff mixture exits the housing where it is mixed again with the air jet coming from nozzle 102. This secondary air jet also guides the chaff mixture in the desired direction.

Figure 9:
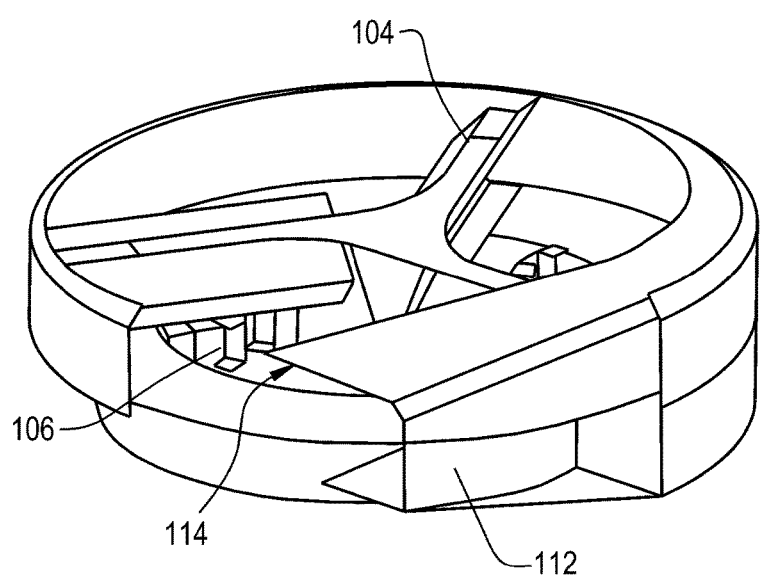
FIG. 9 is a partly broken-away isometric view of the chaff impeller portion of another single spreader unit illustrating a further variation.
Figure 10:
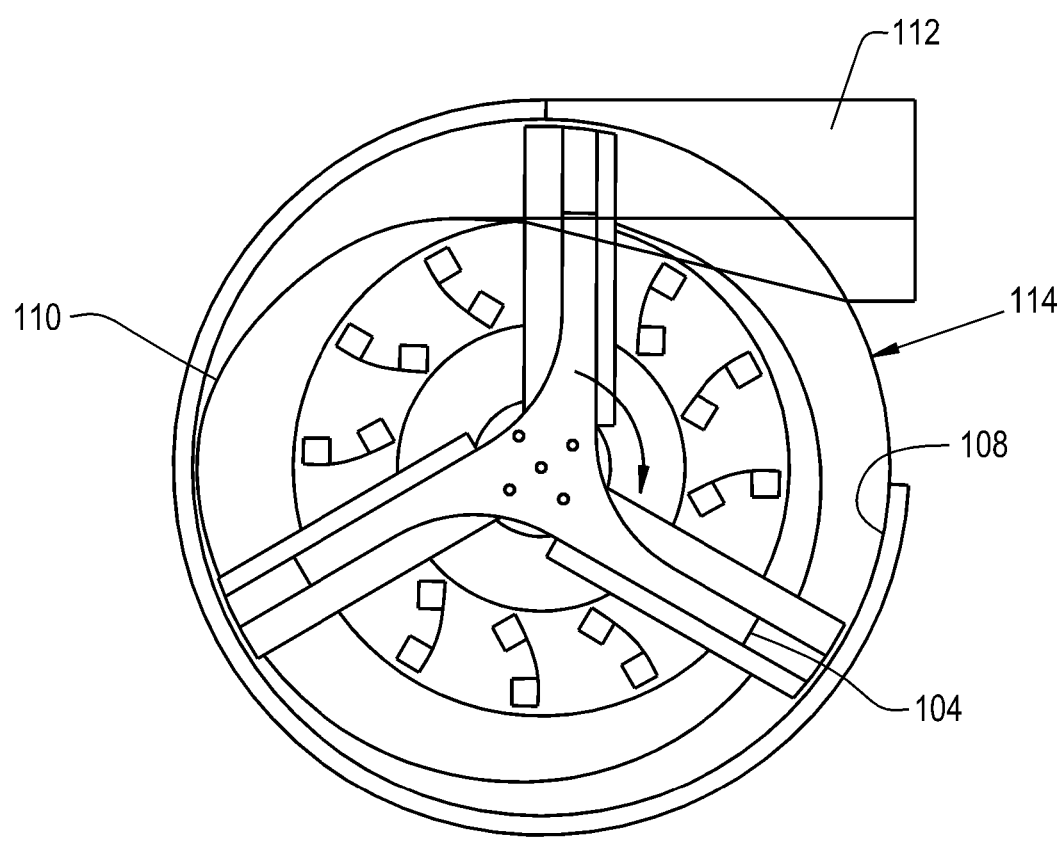
FIG. 10 is a top view of the single spreader unit of FIG. 9.

There is a risk of clogging of the small nozzles 100 and 102 due to debris. This risk is avoided according to another variation on the present invention. In FIGS. 9 and 10, the chaff impeller 104 is mounted on a shaft shared with the fan 106 beneath it. The fan operates as described earlier, but the routing of airflow from the fan to the chaff exiting the impeller is quite different. The scroll-shaped housing 108 narrows and air velocity increases near the narrow portion 110 of a shroud 112. Airflow from the fan into the narrow portion of the shroud is guided or directed by the shroud along a somewhat circular path to receive chaff exiting open area 114. The shroud 112 may also direct airflow into the region of the impeller to mix with the chaff prior to the chaff exiting the open area 114.

The principles of a dual airflow from the discussion of FIGS. 6-10 may be advantageously applied to the earlier described embodiments. The principles of the present invention could, for example, be applied to a horizontal residue spreader that spreads all of the crop residue, not just the chaff. Likewise, the concept could be applied to a vertical spreader. A vertical spreader could be designed that accepts material on the outer side of the left hand impeller, passes it circumferentially under the left hand impeller before throwing it at the right hand impeller to throw over the top of the right hand impeller. This would have the benefit of discharging crop at the topside of the spreader for maximum trajectory.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spreader arrangement for dispersing crop residue laterally from each side of an agricultural harvester, comprising:
    at least first and second spreader units spaced one from the other on opposite sides of a harvester longitudinal centerline;
    each spreader unit including a generally vertically extending rotor having an impeller near an upper end thereof for expelling crop residue from the harvester and a fan near a lower end thereof for creating an airflow to assist in dispersing crop residue; and
    at least one conduit for ducting the airflow obliquely upward from said fan to said impeller.

2. The spreader arrangement of claim 1, wherein rotation of each impeller causes residue to execute a generally circular motion and exit generally tangential thereto from the respective spreader unit directly into a laterally directed airflow from at least one of the fans, said laterally directed airflow intersecting said exiting residue at the point of said generally tangential exit from said impeller.

3. The spreader arrangement of claim 2, wherein the laterally directed airflow for each spreader unit impeller is provided by the fan of that same spreader unit.

4. The spreader arrangement of claim 2, each spreader unit further including an additional conduit for providing an additional airflow from the fan to the corresponding impeller to mix with residue within the circular motion prior to exiting.

5. The spreader arrangement of claim 1, further including a plenum for routing at least part of the airflow from the first unit fan to the vicinity of the second unit impeller and at least part of the airflow from the second unit fan to the vicinity of the first unit impeller.

6. The spreader arrangement of claim 5, wherein the plenum comprises first and second isolated conduits for routing substantially the entirety of the airflow from the first spreader unit fan to the vicinity of the second spreader unit impeller and substantially the entirety of the airflow from the second spreader unit fan to the vicinity of the first spreader unit impeller.

7. The spreader arrangement of claim 5, wherein the plenum comprises a common chamber for commingling the airflow from each fan and supplying a portion of the airflow from each fan to the vicinity of each impeller.

8. A spreader arrangement for an agricultural harvester, comprising:
    at least first and second spaced apart spreader units, each unit including an impeller for expelling crop residue from the harvester, and a pneumatic source for creating an airflow to assist in dispersing the crop residue; and
    a plenum for routing at least part of the airflow obliquely upward from the first unit pneumatic source to the vicinity of the second unit impeller to aid residue expulsion therefrom and at least part of the airflow obliquely upward from the second unit pneumatic source to the vicinity of the first unit impeller to aid residue expulsion therefrom.

9. The spreader arrangement of claim 8, wherein each spreader unit includes a rotor having a respective impeller near one end thereof, and a fan near the other end thereof comprising the respective pneumatic source.

10. The spreader arrangement of claim 9, wherein the rotors are spaced apart and extend generally vertically, one to each side of an agricultural harvester longitudinal center line.

11. The spreader arrangement of claim 9, wherein rotation of each impeller causes residue to execute a generally circular motion and exit generally tangential thereto from the respective spreader unit directly into said airflow, the plenum including a pair of nozzles, one at the point of said generally tangential exit of said residue from each impeller, for directing airflow along the tangential path of the exiting residue.

12. A process of dispersing crop residue from the operation of a harvesting machine, comprising:
    generating at least one airflow near the bottom and laterally to at least one side of the harvesting machine;
    spinning crop residue from a harvesting operation using at least one spinning mechanism, and causing crop residue to exit the harvesting machine from one of said at least one sides of the harvesting machine;
    ducting said at least one generated airflow obliquely upward toward the crop residue exiting said at least one spinning mechanism;
    shaping said at least one ducted airflow by passing it through at least one nozzle to provide at least one residue entraining airflow; and
    directing the exiting crop residue with an initial velocity to join with and be entrained in said at least one shaped residue entraining airflow.

13. The process of claim 12, including the additional steps of ducting a portion of said at least one generated airflow to the spinning crop residue, and merging said ducted airflow portion with the spinning crop residue at a point where said spinning crop residue exits generally tangentially from said at least one spinning mechanism prior to the crop residue exiting the harvesting machine.

14. The process of claim 12, wherein the step of ducting is performed along a path which is optimally direct.

15. The process of claim 12, further comprising:
    generating a single airflow near the bottom and laterally to one side of the harvesting machine;
    spinning crop residue from said harvesting operation using a single spinning mechanism, causing crop residue to exit the harvesting machine from said one side of the harvesting machine;

ducting said single generated airflow obliquely upward toward the crop residue exiting said single spinning mechanism;

shaping said single ducted airflow by passing it through a single nozzle to provide a single residue entraining airflow;

directing the crop residue exiting said one side of the harvesting machine with an initial velocity to join with and be entrained in said single shaped residue entraining airflow.

16. The process of claim 12, further comprising:

generating a first airflow near the bottom and laterally to a first side of the harvesting machine;

generating a second airflow near the bottom and laterally to a second side of the harvesting machine;

spinning crop residue from said harvesting operation using a first spinning mechanism and a second spinning mechanism, causing crop residue to exit the harvesting machine from said first side of the harvesting machine and from said second side of the harvesting machine, respectively;

ducting at least part of said first generated airflow obliquely upward toward the crop residue exiting said second spinning mechanism;

ducting at least part of said second generated airflow obliquely upward toward the crop residue exiting said first spinning mechanism;

shaping said first ducted airflow by passing it through a first nozzle to provide a first residue entraining airflow;

shaping said second ducted airflow by passing it through a second nozzle to provide a second residue entraining airflow;

directing the crop residue exiting said first side of the harvesting machine with an initial velocity to join with and be entrained in said second shaped residue entraining airflow; and directing the crop residue exiting said second side of the harvesting machine with an initial velocity to join with and be entrained in said first shaped residue entraining airflow.

17. The process of claim 12, further comprising:

generating a first airflow near the bottom and laterally to a first side of the harvesting machine;

generating a second airflow near the bottom and laterally to a second side of the harvesting machine;

spinning crop residue from said harvesting operation using a first spinning mechanism and a second spinning mechanism, causing crop residue to exit the harvesting machine from said first side of the harvesting machine and from said second side of the harvesting machine, respectively;

ducting said first generated airflow obliquely upward toward the crop residue exiting said first spinning mechanism;

ducting said second generated airflow obliquely upward toward the crop residue exiting said second spinning mechanism;

shaping said first ducted airflow by passing it through a first nozzle to provide a first residue entraining airflow;

shaping said second ducted airflow by passing it through a second nozzle to provide a second residue entraining airflow;

directing the crop residue exiting said first side of the harvesting machine with an initial velocity to join with and be entrained in said first shaped residue entraining airflow; and directing the crop residue exiting said second side of the harvesting machine with an initial velocity to join with and be entrained in said second shaped residue entraining airflow.

* * * * *